(12) United States Patent
Sato et al.

(10) Patent No.: US 11,499,582 B2
(45) Date of Patent: Nov. 15, 2022

(54) FASTENING MEMBER LOOSENING DETECTION TAG

(71) Applicant: KAWASAKI RAILCAR MANUFACTURING CO., LTD., Kobe (JP)

(72) Inventors: Yoshi Sato, Sanda (JP); Takehiro Nishimura, Kobe (JP); Masayuki Mitsue, Kobe (JP); Yuta Yoshimatsu, Kobe (JP)

(73) Assignee: KAWASAKI RAILCAR MANUFACTURING CO., LTD., Kobe (JP)

( * ) Notice: Subject to any disclaimer, the term of this patent is extended or adjusted under 35 U.S.C. 154(b) by 356 days.

(21) Appl. No.: 16/758,964

(22) PCT Filed: Oct. 18, 2018

(86) PCT No.: PCT/JP2018/038766
§ 371 (c)(1),
(2) Date: Apr. 24, 2020

(87) PCT Pub. No.: WO2019/082777
PCT Pub. Date: May 2, 2019

(65) Prior Publication Data
US 2020/0347869 A1    Nov. 5, 2020

(30) Foreign Application Priority Data

Oct. 24, 2017    (JP) .............................. JP2017-205033

(51) Int. Cl.
*F16B 31/02*    (2006.01)
*G06K 19/07*    (2006.01)
*G06K 19/077*   (2006.01)

(52) U.S. Cl.
CPC .......... *F16B 31/02* (2013.01); *G06K 19/0717* (2013.01); *G06K 19/07749* (2013.01); *G06K 19/07758* (2013.01); *G06K 19/07798* (2013.01)

(58) Field of Classification Search
CPC ......... G06K 19/0717; G06K 19/07726; G06K 19/07758; G06K 19/0776;
(Continued)

(56) References Cited

U.S. PATENT DOCUMENTS

| | | | | |
|---|---|---|---|---|
| 2003/0128119 A1* | 7/2003 | Lake | ...................... | G08B 23/00 340/573.2 |
| 2007/0069895 A1* | 3/2007 | Koh | ................... | G08B 13/2417 340/572.1 |

(Continued)

FOREIGN PATENT DOCUMENTS

| | | |
|---|---|---|
| CN | 105160364 A | 12/2015 |
| JP | S58-56215 U | 4/1983 |

(Continued)

OTHER PUBLICATIONS

English machine translation of JP JP 2009064111, retrieved from European Patent Office, retrieved Jun. 10, 2022 (Year: 2022).*

*Primary Examiner* — Suezu Ellis
(74) *Attorney, Agent, or Firm* — Oliff PLC

(57) ABSTRACT

A tag configured to detect loosening of a fastening member fastened to a fastened part of an apparatus includes: a base sheet including a fastening member attached portion and a fastened part attached portion, the fastening member attached portion being attached to the fastening member, the fastened part attached portion being attached to the fastened part; a RFID chip mounted on the base sheet; an antenna circuit mounted on the base sheet while being connected to the RFID chip; and an electric conductor mounted on the base sheet while being connected to the RFID chip, the (Continued)

electric conductor being configured such that an electric property of the electric conductor changes when the fastening member is displaced relative to the fastened part attached portion.

14 Claims, 11 Drawing Sheets

(58) Field of Classification Search
CPC .............. G06K 19/07798; F16B 31/02; B65D 2203/10; G09F 3/03; G09F 3/0335
USPC ................. 235/492; 340/572.1, 572.8, 572.9
See application file for complete search history.

(56) References Cited

U.S. PATENT DOCUMENTS

| | | | |
|---|---|---|---|
| 2007/0139205 A1 | 6/2007 | Tanaka et al. | |
| 2010/0289647 A1* | 11/2010 | Rudduck | F16B 31/02 340/572.1 |
| 2014/0079504 A1* | 3/2014 | Wols | F16B 31/02 411/8 |
| 2018/0197065 A1 | 7/2018 | Yamaoka et al. | |
| 2019/0135501 A1* | 5/2019 | Chandra | G06K 19/07798 |
| 2020/0140163 A1* | 5/2020 | Novak | B65D 55/028 |

FOREIGN PATENT DOCUMENTS

| | | | |
|---|---|---|---|
| JP | H06-186167 A | | 7/1994 |
| JP | 2005-107176 A | | 4/2005 |
| JP | 2007-293797 A | | 11/2007 |
| JP | 2009-064111 A | | 3/2009 |
| JP | 2009064111 A | * | 3/2009 |
| JP | 2009-066667 A | | 4/2009 |
| JP | 2011-241567 A | | 12/2011 |
| JP | 2014-089068 A | | 5/2014 |
| KR | 10-2015-0077839 A | | 7/2015 |
| KR | 2015077839 A | * | 7/2015 |
| WO | 2006/016559 A1 | | 2/2006 |
| WO | 2008/013049 A1 | | 1/2008 |
| WO | 2017/041724 A1 | | 3/2017 |

* cited by examiner

FASTENING MEMBER LOOSENING DETECTION TAG

TECHNICAL FIELD

The present invention relates to a tag configured to detect loosening of a fastening member fastened to a fastened part of an apparatus.

BACKGROUND ART

Conventionally proposed is a method of detecting loosening of a bolt to prevent the bolt from falling off, the bolt fastening a part of a mechanical apparatus. For example, PTL 1 discloses that: an optical fiber cable is extended between a bolt and a base; and the loosening of the bolt is detected by monitoring breaking of the optical fiber cable or a change of light passing through the optical fiber cable, the breaking or the change being caused due to an angular displacement of the bolt relative to the base.

CITATION LIST

Patent Literature

PTL 1: Japanese Laid-Open Patent Application Publication No. 6-186167

SUMMARY OF INVENTION

Technical Problem

According to the configuration of PTL 1, holes through which the optical fiber cable is extended need to be formed at the bolt and the base, and a pin configured to fix the cable needs to be attached to the base. Therefore, the bolt and the base need to be configured as special parts, and this is problematic in terms of versatility. Further, the optical fiber cable, an electronic device for detection of the breaking of the cable, and the like need to be mounted on the mechanical apparatus, and this increases the weight of the apparatus.

An object of the present invention is to provide a configuration capable of detecting loosening of a fastening member while having high versatility and preventing an increase in weight of a mechanical apparatus to which a fastening member is attached.

Solution to Problem

A fastening member loosening detection tag according to one aspect of the present invention is a tag configured to detect loosening of a fastening member fastened to a fastened part of an apparatus and includes: a base sheet including a fastening member attached portion and a fastened part attached portion, the fastening member attached portion being attached to the fastening member, the fastened part attached portion being attached to the fastened part; a RFID chip mounted on the base sheet; an antenna circuit mounted on the base sheet while being connected to the RFID chip; and an electric conductor mounted on the base sheet while being connected to the RFID chip, the electric conductor being configured such that an electric property of the electric conductor changes when the fastening member is displaced relative to the fastened part attached portion.

According to the above configuration, the fastening member (for example, a bolt or a nut) is displaced relative to the fastened part, and therefore, a change in an electric conduction state of the electric conductor is detected wirelessly. With this, the loosening of the fastening member or the indication of the loosening of the fastening member can be detected. Therefore, a receiver configured to receive a wireless signal from an antenna, a diagnosing computer, and the like can be configured as ground facilities. On this account, the number of devices mounted on a mechanical apparatus for the detection of the loosening can be reduced. In addition, since the fastening member loosening detection tag is only required to be attached to the fastening member and the fastened part, the fastening member and the fastened part do not have to have special structures.

Advantageous Effects of Invention

The present invention can provide a configuration capable of detecting the loosening of the fastening member while having high versatility and preventing an increase in weight of the mechanical apparatus to which the fastened member is attached.

DESCRIPTION OF EMBODIMENTS

Hereinafter, embodiments will be described with reference to the drawings. In the following description, a direction in which a railcar travels and a car body extends is referred to as a car longitudinal direction (front-rear direction), and a lateral direction perpendicular to the car longitudinal direction is referred to as a car width direction (left-right direction).

Figure 1:
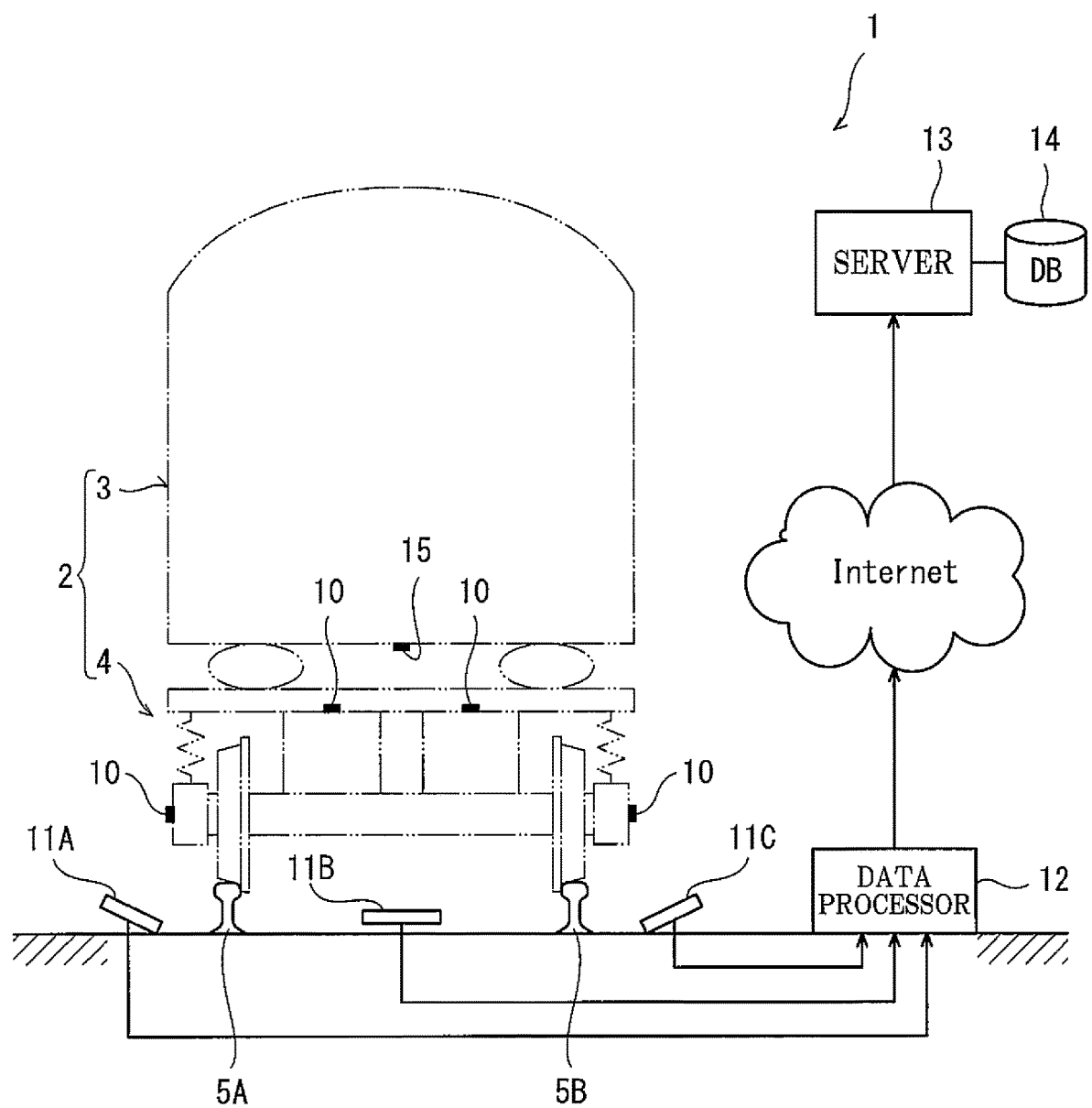
FIG. 1 is a schematic diagram of a fastening member loosening detection system of a railcar, the fastening member loosening detection system including a fastening member loosening detection tag according to Embodiment 1.

FIG. 1 is a schematic diagram of a fastening member loosening detection system 1 of a railcar 2, the fastening member loosening detection system 1 including a fastening member loosening detection tag 10 according to Embodiment 1. As shown in FIG. 1, the railcar 2 is a train set including a plurality of cars coupled to each other. Each of the cars includes a car body 3 and a bogie 4. The fastening member loosening detection system 1 is a system configured to automatically detect loosening of a fastening member by utilizing a RFID (Radio frequency identifier) to reduce a maintenance load of the fastening member, the fastening member being configured to fasten a fastened part of an apparatus. The fastening member loosening detection system 1 includes: a plurality of fastening member loosening detection tags 10 respectively attached to a plurality of fastening members (such as bolts or nuts); a plurality of readers 11A to 11C; a data processor 12; a server 13; and a data base 14.

In the present embodiment, the "apparatus" as a target to which the fastening member loosening detection tag 10 is applied is the railcar 2, and the "fastened part" as a target fastened by the fastening member to which the fastening member loosening detection tag 10 is attached is a part (for example, a part of the bogie 4, such as a motor fixed portion, a gear box fixed portion, an axle box, its peripheral part, a brake fixed portion, or an axle beam tube) fastened to a component of the railcar 2.

The fastening member loosening detection tag 10 is a RF tag, and a detailed configuration thereof will be described later. A car body RF tag 15 is attached to each car body 3. For example, the car body RF tag 15 is attached to an underfloor surface of the car body 3. Each of the readers 11A to 11C reads a signal containing identification information of the fastening member loosening detection tag 10 in a noncontact manner. The readers 11A to 11C are provided in the vicinity of rails 5A and 5B. For example, the readers 11A to 11C are provided at an entrance of a train shed. However, the readers 11A to 11C may be provided at a commercial line. Locations at which the readers 11A to 11C are provided are not especially limited. One or more of the readers 11A to 11C also read a signal containing identification information of the car body RF tag 15 in a noncontact manner. Specifically, the reader 11A is provided outside the rail 5A in the car width direction. Further, the reader 11B is provided between the pair of rails 5A and 5B, and the reader 11C is provided outside the rail 5B in the car width direction.

The data processor 12 processes the signals read by the readers 11A to 11C and transmits the signals to the server 13 through a network (the Internet, for example). To be specific, in the present embodiment, a computer is divided into the data processor 12 and the server 13 which are connected to each other through the network. It should be noted that the network is not limited to the Internet and may be any communication network, such as a LAN, a WAN, a satellite communication line, or a mobile phone network. The server 13 analyzes data of the signals from the data processor 12, creates a maintenance plan of the fastening members based on analysis data, and transmits the maintenance plan to a maintenance management center (not shown). The analysis data of the server 13 and the like are accumulated and stored as past information in the data base 14.

Based on the data of the signal output from the car body RF tag 15 and read by the reader 11B, the data processor 12 determines car specifying information corresponding to the signals output from the fastening member loosening detection tags 10 and read by the readers 11A to 11C. The car specifying information is information, such as a car number, a train set number, or a bogie, which can be associated with a location at which the fastening member is provided.

Figure 2A:
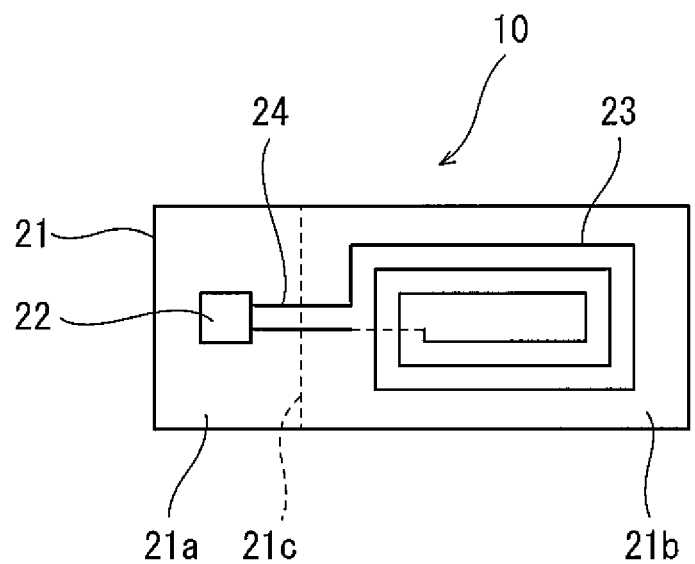
FIG. 2A is a plan view of the fastening member loosening detection tag shown in FIG. 1.
Figure 2B:
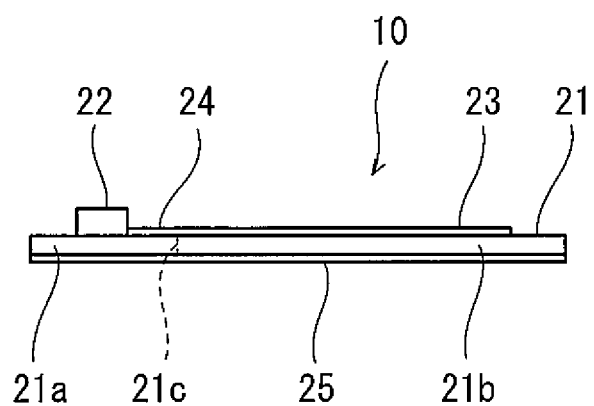
FIG. 2B is a side view of the fastening member loosening detection tag shown in FIG. 1.

FIG. 2A is a plan view of the fastening member loosening detection tag 10 shown in FIG. 1. FIG. 2B is a side view of the fastening member loosening detection tag 10 shown in FIG. 1. As shown in FIGS. 2A and 2B, the fastening member loosening detection tag 10 includes a base sheet 21, a RFID chip 22, an antenna circuit 23, and an electric conductor 24. The base sheet 21 is made of a soft material (for example, resin), such as a polymeric material. The base sheet 21 includes a fastening member attached portion 21a, a fastened part attached portion 21b, and a breakage scheduled portion 21c (such as perforations, a thin portion, or a narrow portion) formed between the fastening member attached portion 21a and the fastened part attached portion 21b. An adhesive layer 25 for attachment is formed on a back surface of the base sheet 21, the back surface facing the fastening member and the fastened member. Before the fastening member loosening detection tag 10 is used, i.e., while the fastening member loosening detection tag 10 is being stored, the adhesive layer 25 is being covered with a release paper (not shown).

The RFID chip 22 is an IC chip that stores the identification information. The RFID chip 22 is mounted on the fastening member attached portion 21a. The antenna circuit 23 includes an antenna element and is mounted on the fastened part attached portion 21b. The electric conductor 24 is an electric wire that electrically connects an antenna connecting terminal of the RFID chip 22 to the antenna circuit 23. The electric conductor 24 passes through the breakage scheduled portion 21c and extends from the fastening member attached portion 21a to the fastened part attached portion 21b. It is preferable that the RFID chip 22, the antenna circuit 23, and the electric conductor 24 be entirely covered with a surface protective sheet (not shown), such as a plastic film.

Figure 3A:
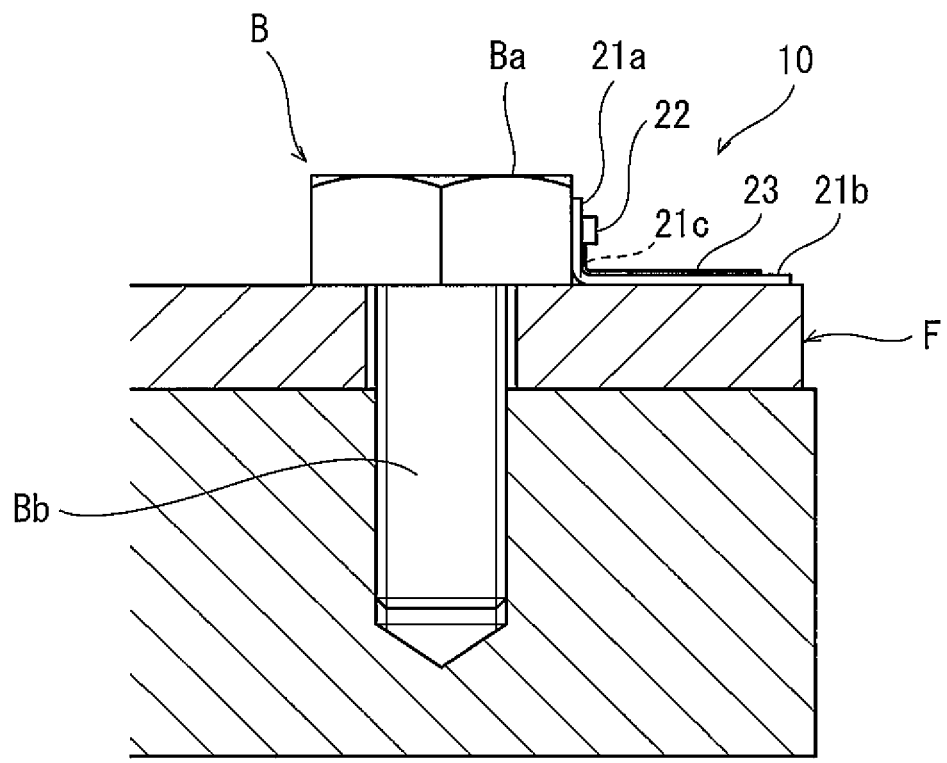
FIG. 3A is a side view showing a use state of the fastening member loosening detection tag shown in FIG. 2.
Figure 3B:
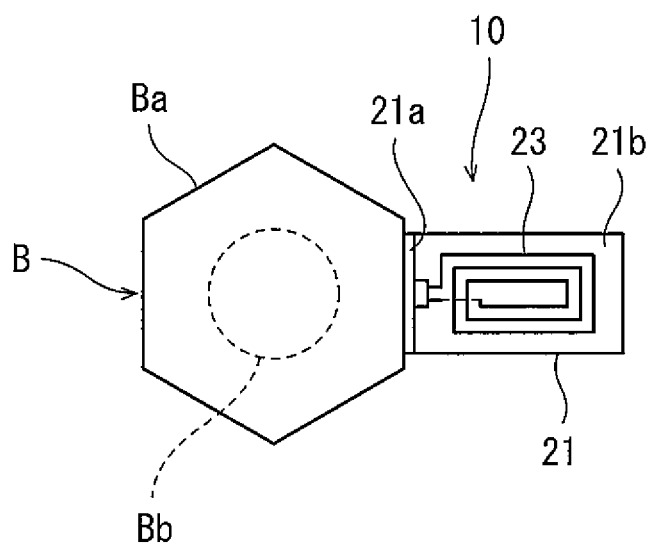
FIG. 3B is a plan view showing the use state of the fastening member loosening detection tag shown in FIG. 2.

FIG. 3A is a side view showing a use state of the fastening member loosening detection tag 10 shown in FIG. 2. FIG. 3B is a plan view showing the use state of the fastening member loosening detection tag 10 shown in FIG. 2. As shown in FIGS. 3A and 3B, as a use example of the fastening member loosening detection tag 10, the fastening member attached portion 21a of the base sheet 21 is attached to a side surface of a head Ba of a bolt B, and the fastened part attached portion 21b of the base sheet 21 is attached to a surface of a fastened part F into which a shaft Bb of the bolt B is inserted. In this case, since the base sheet 21 is soft, the base sheet 21 can be bent along a corner between the head Ba of the bolt B and the fastened part F, and therefore, the work property is excellent.

Specifically, the base sheet 21 is bent at the breakage scheduled portion 21c that is lower in rigidity than the other portion of the base sheet 21, and with this, attaching work can be performed extremely easily. Further, when there is an adequate space on the surface of the fastened part F which surface is located in the vicinity of the bolt B, the antenna circuit 23 provided at the fastened part attached portion 21b attached to the fastened part F is increased in size, and this can improve transmission/reception sensitivity.

A front surface of the base sheet 21 (i.e., a surface that is exposed to an outside and opposite to the back surface facing the bolt B and the fastened part F) has a color (for example, white) that is different from the color of the bolt B and the color of the fastened part F. With this, the deformation of the base sheet 21 due to the loosening of the bolt B can be visually and easily confirmed, and therefore, the loosening of the bolt B can be easily recognized by visual observation.

Figure 4:
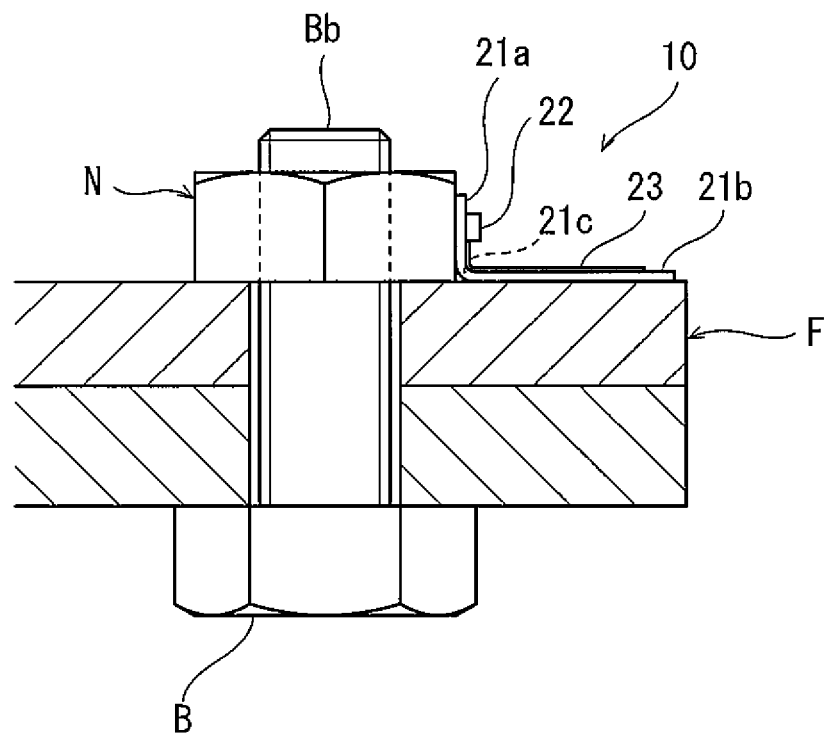
FIG. 4 is a side view showing another use state of the fastening member loosening detection tag shown in FIG. 2.

FIG. 4 is a side view showing another use state of the fastening member loosening detection tag 10 shown in FIG. 2. As shown in FIG. 4, as another use example of the fastening member loosening detection tag 10, the fastening member attached portion 21a of the base sheet 21 may be attached to a side surface of a nut N (fastening member) that is threadedly engaged with the shaft Bb of the bolt B, and the fastened part attached portion 21b of the base sheet 21 may be attached to the surface of the fastened part F to which surface the nut N is opposed.

The action of the fastening member loosening detection tag 10 is the same between when the fastening member is the bolt B and when the fastening member is the nut N. To be specific, when the bolt B (or the nut N) loosens, the head Ba (or the nut N) rotates relative to the fastened part F, and therefore, the fastening member attached portion 21a is displaced relative to the fastened part attached portion 21b. When the bolt B (or the nut N) rotates relative to the fastened part F at more than a predetermined rotation angle, the displacement of the fastening member attached portion 21a relative to the fastened part attached portion 21b becomes large, and as a result, the base sheet 21 breaks at the breakage scheduled portion 21c, and the electric conductor 24 breaks. Therefore, the electric property of the electric conductor 24 changes. Specifically, the electric conductor 24 changes from a state where the RFID chip 22 and the antenna circuit 23 are electrically conductive to a state where the RFID chip 22 and the antenna circuit 23 are electrically nonconductive.

To be specific, when the bolt B (or the nut N) is not being loosened, and the readers 11A to 11C approach the fastening member loosening detection tag 10, noncontact communication is performed between the fastening member loosening detection tag 10 and the reader 11A, and the data processor 12 receives the identification information of the fastening member loosening detection tag 10. However, when the bolt B (or the nut N) is loosened, and the readers 11A to 11C approach the fastening member loosening detection tag 10, noncontact communication is performed between the fastening member loosening detection tag 10 and the readers 11A to 11C, and the data processor 12 cannot receive the identification information of the fastening member loosening detection tag 10.

Therefore, when the readers 11A to 11C receive the identification information of the fastening member loosening detection tag 10 while the railcar 2 is traveling through the rails 5A and 5B at which the readers 11A to 11C are provided, it can be determined that the fastening member loosening detection tag 10 is not broken, and therefore, the bolt B (or the nut N) is not being loosened. In contrast, when the readers 11A to 11C do not receive the identification information of the fastening member loosening detection tag 10 while the railcar 2 is traveling through the rails 5A and 5B, it can be determined that the fastening member loosening detection tag 10 is broken, and therefore, the bolt B (or the nut N) is being loosened. Therefore, a list of the presence or absence of the loosening of a large number of bolts B (or nuts N) of the railcar 2 can be created in the server 13, and therefore, the maintenance work can be made efficient.

Figure 5:
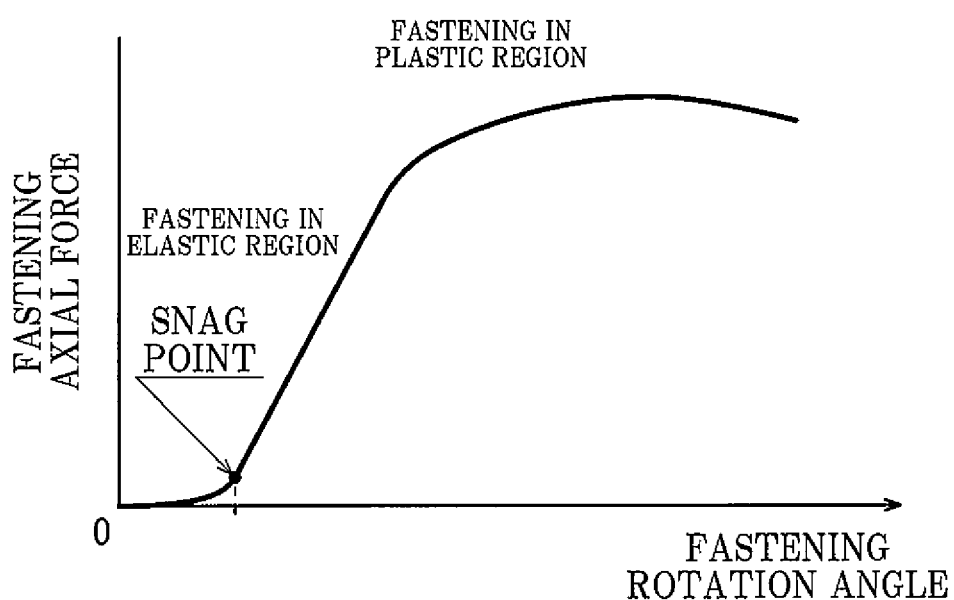
FIG. 5 is a graph showing a relation between a fastening rotation angle of a fastening member and a fastening axial force of the fastening member.

FIG. 5 is a graph showing a relation between a fastening rotation angle of the fastening member and a fastening axial force of the fastening member. As shown in FIG. 5, when the fastening member is made to perform fastening rotation beyond a snag point (axial force≈0) where the fastening member tightly contacts a seat surface of the fastened part, the fastening axial force proportionally increases during the fastening in an elastic region, and therefore, the fastening axial force can be recognized based on the fastening rotation angle. Generally, when the fastening axial force decreases by 10% to 30% or more from a proper design axial force, the fastening member loosens. Therefore, in the fastening member loosening detection tag 10, the strength of the breakage scheduled portion 21c with respect to a return rotation angle of the fastening member is designed such that when the axial force decreases by 10% to 30% or more, the breakage scheduled portion 21c breaks, and therefore, the loosening can be detected.

To be specific, the strength of the breakage scheduled portion 21c is determined in consideration of a material property of the base sheet 21 such that when the bolt B or the nut N to which the base sheet 21 is attached performs return rotation at more than a predetermined return rotation angle (loosening threshold) set to a value within a range of 10% to 30% of a proper fastening rotation angle, the base sheet 21 breaks at the breakage scheduled portion 21c. When the base sheet 21 is made of a polymeric material, such as resin, flexibility of the base sheet 21 is low at low temperature, and therefore, the base sheet 21 tends to break by small return rotation. On the other hand, since the flexibility of the base sheet 21 is high at high temperature, the base sheet 21 tends to break by large return rotation. Therefore, the strength of the breakage scheduled portion 21c is set such that: even at the low temperature at which the flexibility of the base sheet 21 is low, the breakage scheduled portion 21c does not surely break at the return rotation angle that is less than 10% of the proper fastening rotation angle; and at the high temperature at which the flexibility of the base sheet 21 is high, the breakage scheduled portion 21c surely breaks at the return rotation angle that is more than 30% of the proper fastening rotation angle.

Specifically, when the perforations which alternately include uncoupled portions and coupled portions are adopted as the breakage scheduled portion 21c, a ratio of the coupled portions to the uncoupled portions in the perforations is adjusted, i.e., increased or decreased. When the thin portion is adopted as the breakage scheduled portion 21c, the thickness of the thin portion is adjusted, i.e., increased or decreased. When the narrow portion is adopted as the breakage scheduled portion 21c, the width of the breakage scheduled portion 21c is adjusted, i.e., increased or decreased.

According to the above-described configuration, the loosening of the bolt B or the nut N as the fastening member can be detected when: the bolt B or the nut N is displaced relative to the fastened part F; the electric conductor 24 breaks; and it is detected that the readers 11A to 11C cannot receive the wireless signal from the fastening member loosening detection tag 10. Further, the readers 11A to 11C configured to receive the wireless signal from the antenna circuit 23, a diagnosing computer (the data base 14 and the server 13), and the like can be configured as ground facilities. Therefore, the number of devices mounted on the railcar 2 for the detection of the loosening can be reduced. In addition, since the fastening member loosening detection tag 10 is only required to be attached to the bolt B, the nut N, and the fastened part F, the bolt B, the nut N, and the fastened part F do not have to have special structures. On this account, the loosening of the bolt B and the nut N can be detected while preventing an increase in the weight of the railcar 2 and realizing high versatility.

Embodiment 2

Figure 6:
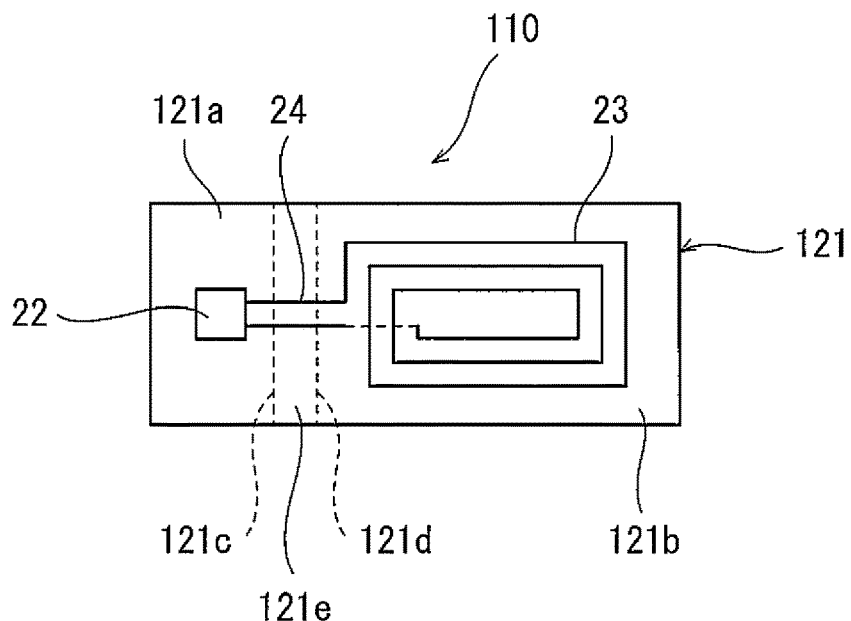
FIG. 6 is a plan view of the fastening member loosening detection tag according to Embodiment 2.

FIG. 6 is a plan view of a fastening member loosening detection tag 110 according to Embodiment 2. As shown in FIG. 6, in the fastening member loosening detection tag 110, two breakage scheduled portions 121c and 121d are provided at a base sheet 121 so as to be spaced apart from each other. The base sheet 121 includes a fastening member attached portion 121a, a fastened part attached portion 121b, the two breakage scheduled portions 121c and 121d (such as perforations, thin portions, or narrow portions) formed between the fastening member attached portion 121a and the fastened part attached portion 121b, and an intermediate portion 121e arranged between the two breakage scheduled portions 121c and 121d. The RFID chip 22 is mounted on the fastening member attached portion 121a, and the antenna circuit 23 is mounted on the fastened part attached portion 121b. The electric conductor 24 that electrically connects the antenna connecting terminal of the RFID chip 22 to the antenna circuit 23 passes through the breakage scheduled portions 121c and 121d and the intermediate portion 121e and extends from the fastening member attached portion 121a to the fastened part attached portion 121b.

Figure 7:
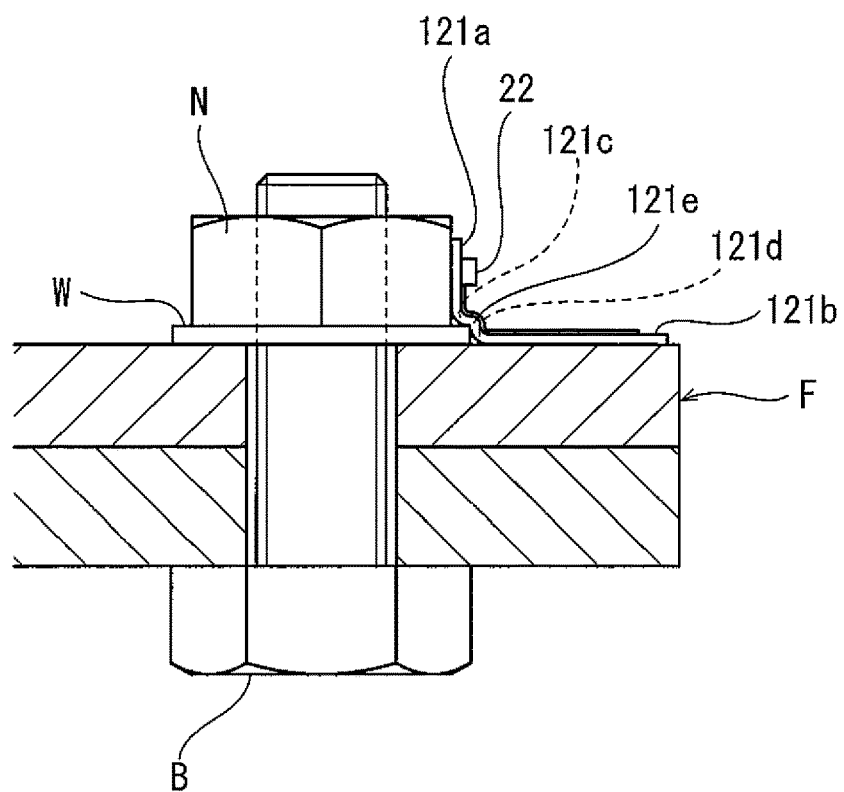
FIG. 7 is a side view showing the use state of the fastening member loosening detection tag shown in FIG. 6.

FIG. 7 is a side view showing the use state of the fastening member loosening detection tag 110 shown in FIG. 6. As shown in FIG. 7, as a use example of the fastening member loosening detection tag 110, the fastening member attached portion 121a of the base sheet 121 is attached to the side surface of the nut N fastened to the bolt B, and the fastened part attached portion 121b of the base sheet 121 is attached to the surface of the fastened part F which surface is located adjacent to the nut N. In this case, since the breakage scheduled portions 121c and 121d are bent, the intermediate portion 121e of the base sheet 121 can be bent along a level difference formed by a washer W supporting the nut N. Thus, work of attaching the fastening member loosening detection tag 110 can be easily performed. Further, a third breakage scheduled portion may be provided at the intermediate portion 121e, and with this, a bent portion may be formed. It should be noted that since the other components are the same as those in Embodiment 1, explanations thereof are omitted.

Embodiment 3

Figure 8:
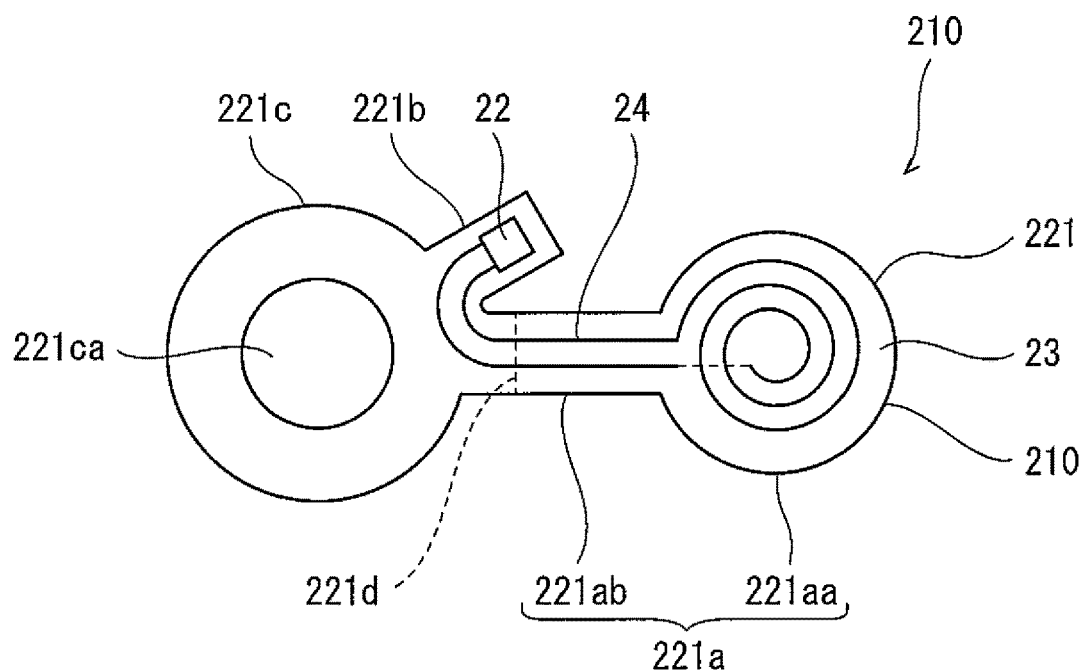
FIG. 8 is a plan view of the fastening member loosening detection tag according to Embodiment 3.
Figure 9:
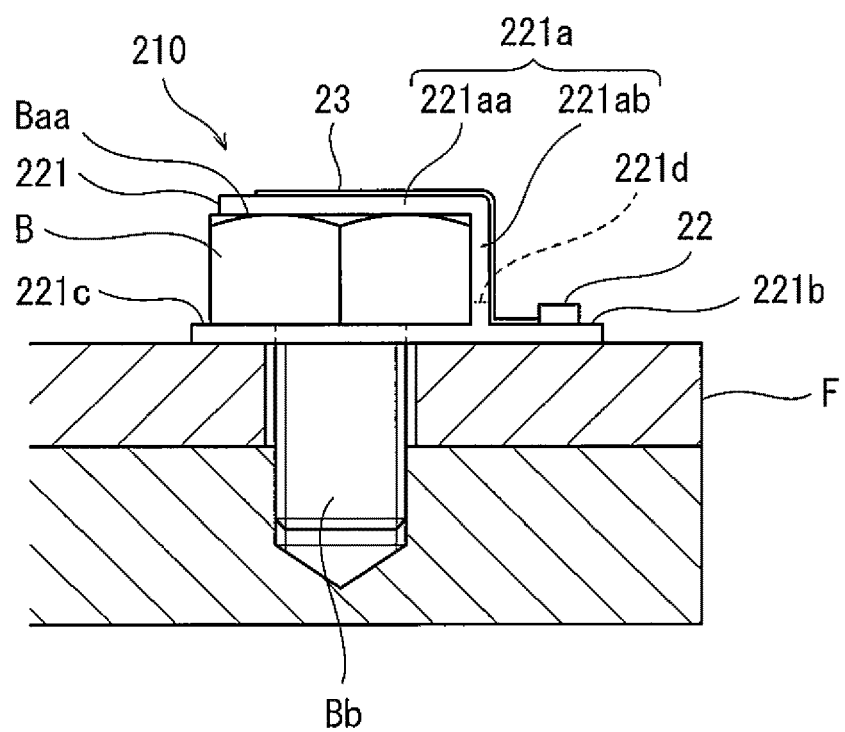
FIG. 9 is a side view showing the use state of the fastening member loosening detection tag shown in FIG. 8.

FIG. 8 is a plan view of a fastening member loosening detection tag 210 according to Embodiment 3. FIG. 9 is a side view showing the use state of the fastening member loosening detection tag shown in FIG. 8. As shown in FIGS. 8 and 9, in the fastening member loosening detection tag 210, a base sheet 221 includes: a fastening member attached portion 221a on which the antenna circuit 23 is mounted; a fastened part attached portion 221b on which the RFID chip 22 is mounted; and an annular bolt engaging portion 221c including an insertion hole 221ca into which the shaft Bb of the bolt B is inserted. In the present embodiment, the fastened part attached portion 221b projects from the bolt engaging portion 221c outward in a radial direction.

The fastening member attached portion 221a includes a first part 221aa and a second part 221ab. The first part 221aa is attached to a top surface Baa of the head Ba of the bolt B. The second part 221ab couples the first part 221aa to the fastened part attached portion 221b. The first part 221aa of the fastening member attached portion 221a has a circular shape, and the antenna circuit 23 is mounted on the first part 221aa. A breakage scheduled portion 221d is formed at the second part 221ab. The electric conductor 24 that electrically connects the RFID chip 22 to the antenna circuit 23 passes through the breakage scheduled portion 221d. It should be noted that an adhesive layer is provided only on a back surface of the first part 221aa of the fastening member attached portion 221a and is not required to be provided on a back surface of the second part 221ab of the fastening member attached portion 221a.

According to the fastening member loosening detection tag 210, even when there is no adequate space on the surface of the fastened part F which surface is located in the vicinity of the bolt B, the antenna circuit 23 having an adequate size can be secured, and this can improve the transmission/reception sensitivity. Further, by inserting the shaft Bb of the bolt B into the insertion hole 221ca of the bolt engaging portion 221c in advance, the fastening member loosening detection tag 210 can be assembled to the bolt B in advance, and this improves the assembly work property. It should be noted that since the other components are the same as those in Embodiment 1, explanations thereof are omitted.

Embodiment 4

Figure 10:
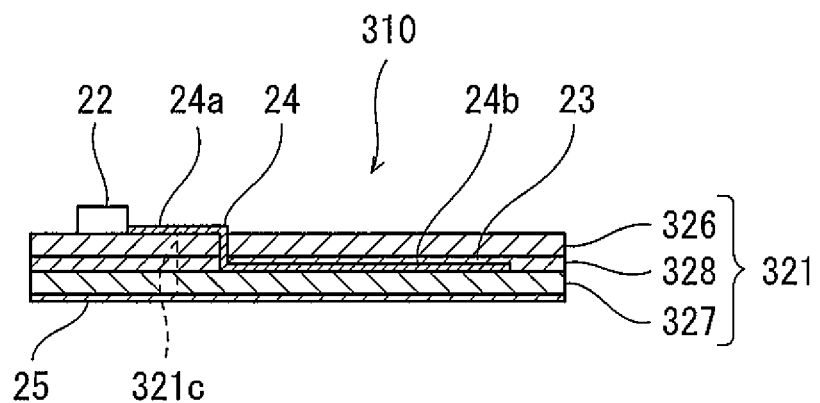
FIG. 10 is a sectional view of the fastening member loosening detection tag according to Embodiment 4.

FIG. 10 is a sectional view of a fastening member loosening detection tag 310 according to Embodiment 4. As shown in FIG. 10, in the fastening member loosening detection tag 310, a base sheet 321 has a double-layer structure. The base sheet 321 includes a first layer 326, a second layer 327, an adhesive layer 328, and the adhesive layer 25. The adhesive layer 328 makes the first layer 326 and the second layer 327 adhere to each other. The adhesive layer 25 is provided on a back surface of the first layer 326 (i.e., a surface opposite to a surface located close to the second layer 327). A breakage scheduled portion 321c is formed at the base sheet 321 so as to be located at a position through which the electric conductor 24 passes. The first layer 326 and the second layer 327 are made of a soft material, such as a polymeric material. Adhesive force between the first layer 326 and the second layer 327 by the adhesive layer 328 is smaller than adhesive force of the first layer 326 adhered to the bolt B and the fastened part F by the adhesive layer 25. Then, the electric conductor 24 connecting the RFID chip 22 and the antenna circuit 23 is extended through the first layer 326 and the second layer 327.

Specifically, the electric conductor 24 includes a first part 24a and a second part 24b. The first part 24a is joined to an upper surface of the first layer 326, and the second part 24b is joined to an upper surface of the second layer 327. Therefore, if a third person maliciously tries to detach the fastening member loosening detection tag 310 attached to the bolt B and the fastened part F, loosen the bolt B, and attach the tag 310 again, separation between the first layer 326 and the second layer 327 is prioritized, and with this, the electric conductor 24 breaks. On this account, malicious mischief with respect to the bolt B to which the fastening member loosening detection tag 310 is attached can be detected. It should be noted that since the other components are the same as those in Embodiment 1, explanations thereof are omitted.

Embodiment 5

Figure 11:
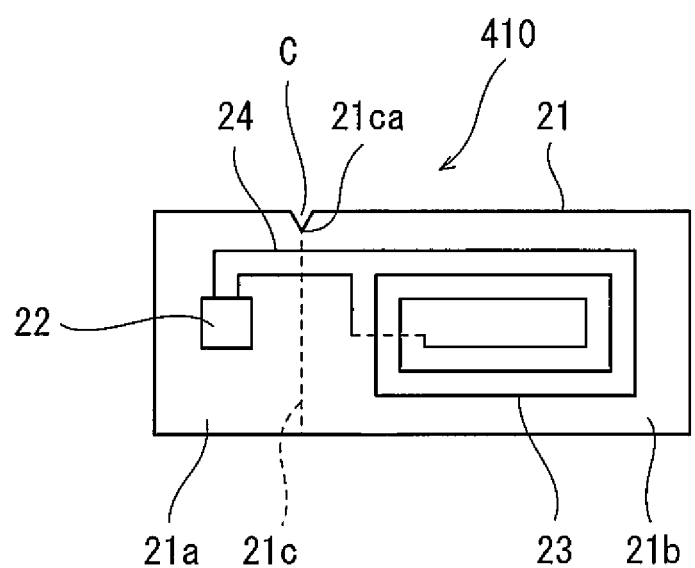
FIG. 11 is a plan view of the fastening member loosening detection tag according to Embodiment 5.

FIG. 11 is a plan view showing a fastening member loosening detection tag 410 according to Embodiment 5. As shown in FIG. 11, in the fastening member loosening detection tag 410, the electric conductor 24 extending across the breakage scheduled portion 21c of the base sheet 21 is located so as to pass through a position of the breakage scheduled portion 21c, the position being located close to a breaking start portion 21ca located at one end of the breakage scheduled portion 21c. Further, a cutout portion C (for example, a V-shaped or U-shaped notch) that promotes the start of the breaking at the breaking start portion 21ca is formed at the base sheet 21. According to this configuration, when the bolt B performs the return rotation with respect to the fastened part F, and the base sheet 21 starts breaking at the breakage scheduled portion 21c from the breaking start portion 21ca, the electric conductor 24 breaks at an early stage, and therefore, the loosening of the bolt B can be detected at an early stage. It should be noted that since the other components are the same as those in Embodiment 1, explanations thereof are omitted.

Embodiment 6

Figure 12A:
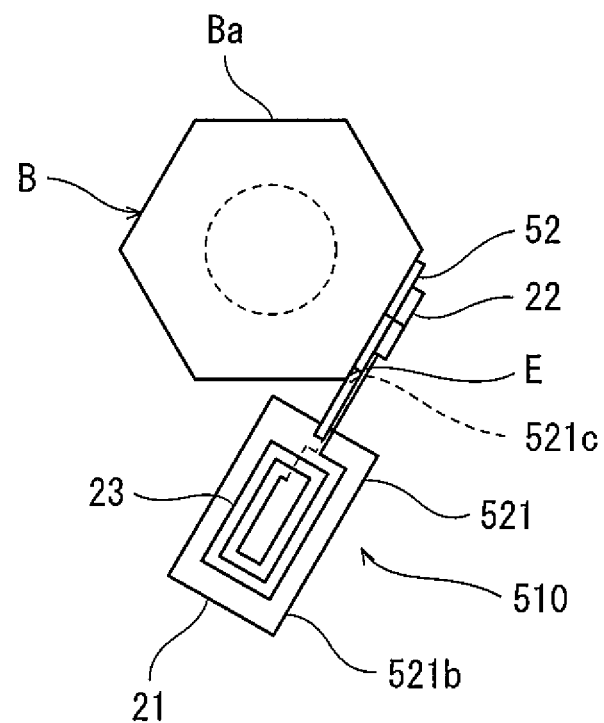
FIG. 12A is a plan view showing the use state of the fastening member loosening detection tag according to Embodiment 6.
Figure 12B:
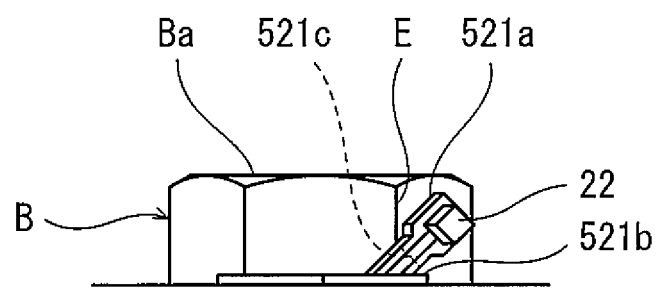
FIG. 12B is a side view showing the use state of the fastening member loosening detection tag according to Embodiment 6.

FIG. 12A is a plan view showing the use state of a fastening member loosening detection tag 510 according to Embodiment 6. FIG. 12B is a side view showing the use state of the fastening member loosening detection tag 510 according to Embodiment 6. As shown in FIGS. 12A and 12B, in the fastening member loosening detection tag 510, a fastening member attached portion 521a projects diagonally with respect to a normal direction and surface direction of a fastened part attached portion 521b. A breakage scheduled portion 521c of a base sheet 521 is provided at a position of the base sheet 521 with which position an edge E of a polygon of the head Ba of the bolt B contacts. According to this configuration, when the bolt B performs the return rotation with respect to the fastened part F, the breakage scheduled portion 521c of the base sheet 521 easily breaks by the edge E. Therefore, when the bolt B is loosened, the electric conductor 24 is easily made to break at the breakage scheduled portion 521c, and therefore, the loosening of the bolt B can be surely detected. It should be noted that since the other components are the same as those in Embodiment 1, explanations thereof are omitted.

Embodiment 7

Figure 13:
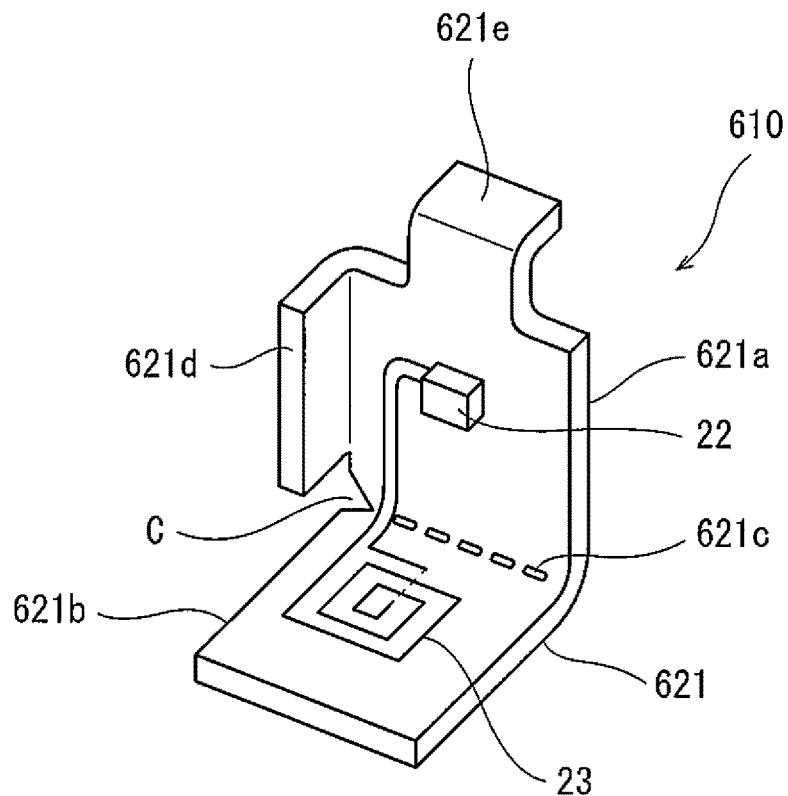
FIG. 13 is a perspective view of the fastening member loosening detection tag according to Embodiment 7.

FIG. 13 is a perspective view of a fastening member loosening detection tag 610 according to Embodiment 7. As shown in FIG. 13, in the fastening member loosening detection tag 610, a base sheet 621 is made of a hard material, such as metal. The base sheet 621 includes a fastening member attached portion 621a, a fastened part attached portion 621b, a breakage scheduled portion 621c, a flange portion 621d, and a pressing portion 621e. The RFID chip 22 is mounted on the fastening member attached portion 621a, and the antenna circuit 23 is mounted on the fastened part attached portion 621b. The electric conductor 24 that electrically connects the RFID chip 22 and the antenna circuit 23 passes through the breakage scheduled portion 621c. The flange portion 621d projects from the fastening member attached portion 621a in a direction perpendicular to the fastening member attached portion 621a. The pressing portion 621e projects from an upper end of the fastening member attached portion 621a in a direction perpendicular to the fastening member attached portion 621a and opposite to the RFID chip 22.

The flange portion 621d increases the rigidity of the fastening member attached portion 621a. The pressing portion 621e presses, from above, the head Ba of the bolt B to which the fastening member attached portion 621a is attached. With this, the pressing portion 621e prevents the movement of the bolt B in the axial direction to prevent the return rotation of the bolt B. The cutout portion C (for example, a V-shaped or U-shaped notch) is formed on the base sheet 621. The cutout portion C is located at one end of the breakage scheduled portion 621c and promotes the start of the breaking. A screw hole by which the fastened part attached portion 621b is fixed to the fastened part F may be provided at the fastened part attached portion 621b. According to this configuration, the loosening of the bolt B can be detected, and the base sheet 621 itself can prevent the return rotation of the bolt B with respect to the fastened part F. Further, according to this configuration, the fastening member loosening detection tag 10, 410, or the like shown in FIG. 2, 11, or the like may be attached to the base plate 621 made of a hard material, such as metal. It should be noted that since the other components are the same as those in Embodiment 1, explanations thereof are omitted.

Embodiment 8

Figure 14:
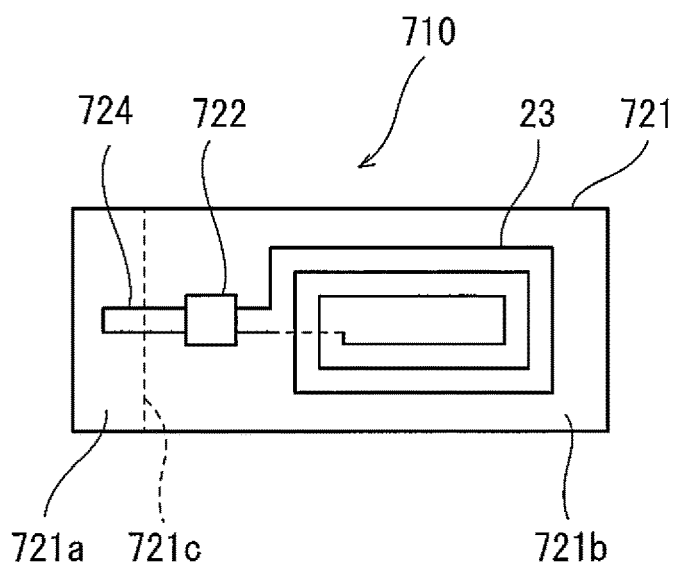
FIG. 14 is a plan view of the fastening member loosening detection tag according to Embodiment 8.

FIG. 14 is a plan view of a fastening member loosening detection tag 710 according to Embodiment 8. As shown in FIG. 14, in the fastening member loosening detection tag 710, a RFID chip 722 and the antenna circuit 23 are mounted on a fastened part attached portion 721b of a base sheet 721, and a closed circuit electric conductor 724 for the detection of the breaking is mounted on a fastening member attached portion 721a. A breakage scheduled portion 721c is formed between the fastening member attached portion 721a and the fastened part attached portion 721b, and the closed circuit electric conductor 724 passes through the breakage scheduled portion 721c.

According to this configuration, when the bolt B performs the return rotation with respect to the fastened part F, the fastening member attached portion 721a is displaced relative to the fastened part attached portion 721b. With this, the base sheet 721 breaks at the breakage scheduled portion 721c, and therefore, the closed circuit electric conductor 724 breaks. When the RFID chip 722 detects the breaking of the closed circuit electric conductor 724, the RFID chip 722 transmits a signal (break signal) from the antenna circuit 23, the signal being different from a signal transmitted before the closed circuit electric conductor 724 breaks. To be specific, when the closed circuit electric conductor 724 breaks at the breakage scheduled portion 721c, the content of the signal wirelessly transmitted from the RFID chip 722 through the antenna circuit 23 changes. Therefore, the change in the signal received by the data processor 12 through the readers 11A to 11C can be detected as the loosening of the bolt B. It should be noted that since the other components are the same as those in Embodiment 1, explanations thereof are omitted.

Embodiment 9

Figure 15:
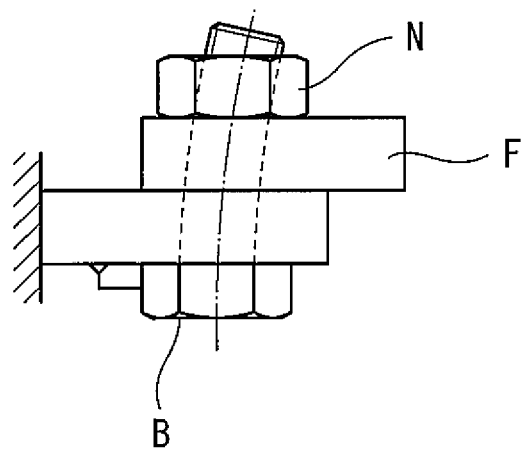
FIG. 15 is a side view for explaining vibration of the fastening member in an axially perpendicular direction.
Figure 16A:
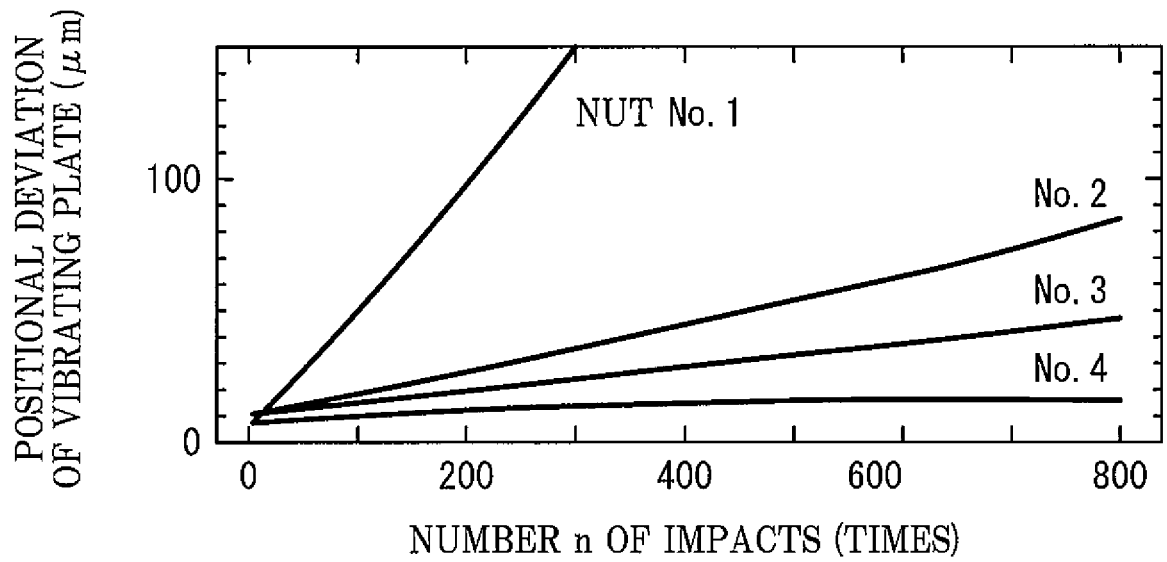
FIG. 16A is a graph showing a relation between the number of impacts in the vibration of the fastening member in the axially perpendicular direction and a positional deviation of a vibrating plate.
Figure 16B:
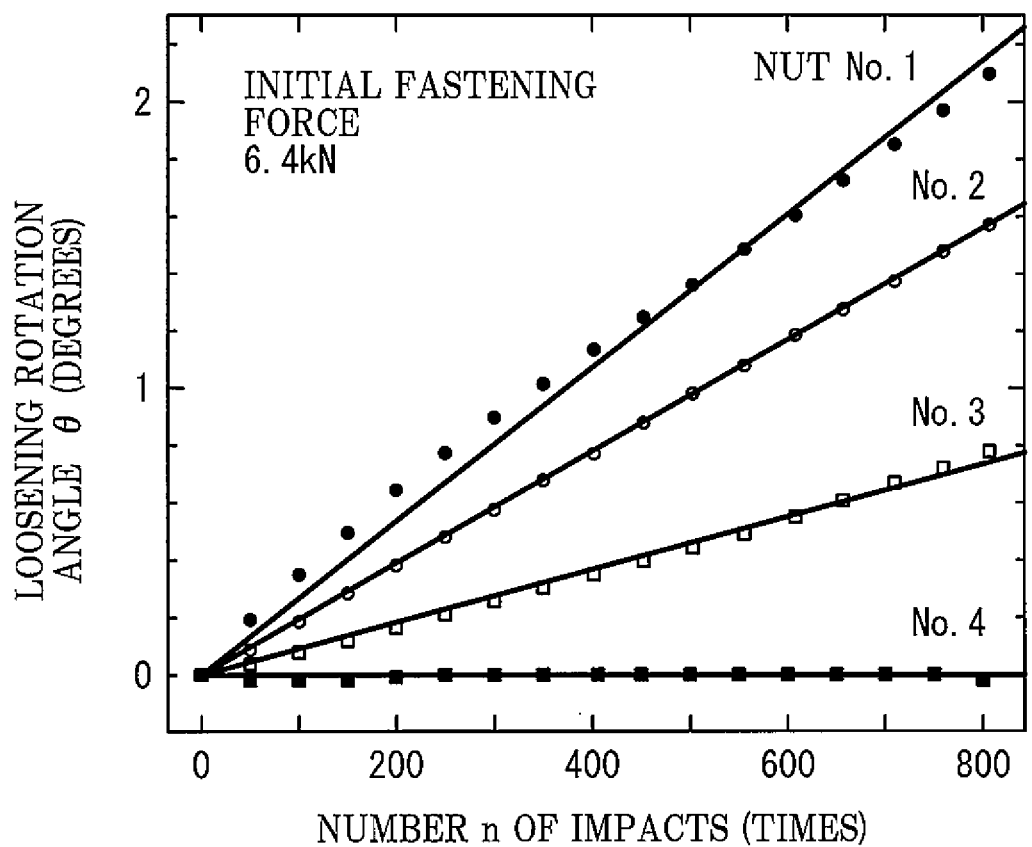
FIG. 16B is a graph showing a relation between the number of impacts and a loosening rotation angle.

FIG. 15 is a side view for explaining vibration of the fastening member (nut N) in an axially perpendicular direction. FIG. 16A is a graph showing a relation between the number of impacts of the vibration of the fastening member in the axially perpendicular direction and a positional deviation of a vibrating plate (fastened part F). FIG. 16B is a graph showing a relation between the number of impacts and a loosening rotation angle. As shown in FIG. 15, when the vibrating plate (fastened part F) repeatedly vibrates in the axially perpendicular direction that is a direction perpendicular to an axis of the fastening member (for example, the nut N), the fastening member (nut N) may loosen. Then, as shown in FIGS. 16A and 16B, when the vibrating plate (fastened part F) is displaced in the axially perpendicular direction by more than a predetermined deviation amount during the vibration, the fastening member (nut N) starts loosening.

In each of the fastening member loosening detection tags 10, 110, 210, 310, 410, 510, 610, and 710 according to the above embodiments, the strength of the breakage scheduled portion (21c, 121c, 221d, 321c, 521c, 621c, 721c) is set such that when the fastening member attached portion (21a, etc.) is displaced relative to the fastened part attached portion (21b, etc.) in the axially perpendicular direction by more than a predetermined deviation amount, the breakage scheduled portion (21c, 121c, 221d, 321c, 521c, 621c, 721c) breaks. The above deviation amount is set to a value within a range of, for example, 5 to 20 μm and may be set to, for example, 10 μm. With this, when the fastened part is displaced (vibrates) relative to the fastening member in the axially perpendicular direction by more than the predetermined deviation amount, the electric conductor (24, 724) breaks, and therefore, the occurrence of the vibration of the fastened part which vibration causes the loosening of the fastening member can be detected. Thus, the indication of the loosening of the fastening member can be detected. It should be noted that since basic components are the same as those in Embodiment 1, explanations thereof are omitted.

The present invention is not limited to the above-described embodiments, and modifications, additions, and eliminations may be made with respect to the configurations of the embodiments. For example, the position of the RFID chip 22 and the position of the antenna circuit 23 may be reversed. Further, the present invention may be configured such that: a piezoelectric element configured to generate voltage when the fastening member attached portion is displaced relative to the fastened part attached portion due to the loosening of the fastening member is mounted on the base sheet; and when the loosening of the fastening member occurs, information of the RFID chip is rewritten in accordance with a voltage change of the electric conductor connected to the piezoelectric element; and a loosening signal is transmitted from the antenna circuit.

REFERENCE SIGNS LIST 2 railcar (apparatus)
10, 110, 210, 310, 410, 510, 610, 710 fastening member loosening detection tag
21, 121, 221, 321, 521, 621, 721 base sheet
21a, 121a, 221a, 521a, 621a, 721a fastening member attached portion
21b, 121b, 221b, 521b, 621b, 721b fastened part attached portion
21c, 121c, 221d, 321c, 521c, 621c, 721c breakage scheduled portion
21ca breaking start portion
22, 722 RFID chip
23 antenna circuit
24, 724 electric conductor
25 adhesive layer
326 first layer
327 second layer
B bolt (fastening member)
B a head
Baa top surface
Bb shaft
E edge
F fastened part
N nut (fastening member)

The invention claimed is:

1. A fastening member loosening detection tag configured to detect loosening of a fastening member fastened to a fastened part of an apparatus,
the fastening member loosening detection tag comprising:
a base sheet including a fastening member attached portion and a fastened part attached portion, the fastening member attached portion being attached to the fastening member, the fastened part attached portion being attached to the fastened part;
a radio frequency identification (RFID) chip mounted on the base sheet;
an antenna circuit mounted on the base sheet while being connected to the RFID chip; and
an electric conductor mounted on the base sheet while being connected to the RFID chip, the electric conductor being configured such that an electric property of the electric conductor changes when the fastening member is displaced relative to the fastened part attached portion, wherein
the base sheet includes a first layer and a second layer adhered to the first layer;
the electric conductor is extended through the first layer and the second layer; and
adhesive force between the first layer and the second layer is smaller than adhesive force of the base sheet adhered to the fastened part and the fastening member.

2. The fastening member loosening detection tag according to claim 1, wherein:
the base sheet includes a breakage scheduled portion formed between the fastening member attached portion and the fastened part attached portion; and
the electric conductor passes through the breakage scheduled portion and is extended between the fastening member attached portion and the fastened part attached portion.

3. The fastening member loosening detection tag according to claim 2, wherein:
the RFID chip is mounted on one of the fastening member attached portion and the fastened part attached portion;
the antenna circuit is mounted on the other of the fastening member attached portion and the fastened part attached portion; and
the electric conductor connects the RFID chip to the antenna circuit.

4. The fastening member loosening detection tag according to claim 2, wherein:
the breakage scheduled portion extends in one direction at the base sheet; and
the electric conductor passes through a position of the breakage scheduled portion, the position being located close to a breaking start portion located at one end of the breakage scheduled portion.

5. The fastening member loosening detection tag according to claim 2, wherein the breakage scheduled portion is provided at a position of the base sheet with which position an edge of the fastening member contacts.

6. The fastening member loosening detection tag according to claim 1, wherein:
the RFID chip and the antenna circuit are mounted on one of the fastening member attached portion and the fastened part attached portion; and
when the RFID chip detects a change in the electric property of the electric conductor, the RFID chip transmits a signal from the antenna circuit, the signal being different from a signal transmitted before the electric property of the electric conductor changes.

7. The fastening member loosening detection tag according to claim 1, wherein the antenna circuit is mounted on the fastened part attached portion.

8. The fastening member loosening detection tag according to claim 1, wherein:
the fastening member is a bolt;
the fastening member attached portion includes
a first part attached to a top surface of a head of the bolt and
a second part coupling the first part to the fastened part attached portion; and
the antenna circuit is mounted on the first part of the fastening member attached portion.

9. The fastening member loosening detection tag according to claim 1, wherein:
the fastening member is a bolt; and
the base sheet further includes a bolt engaging portion having an insertion hole into which a shaft of the bolt is inserted.

10. The fastening member loosening detection tag according to claim 1, wherein when the fastening member performs return rotation at more than a return rotation angle that is preset within a range of 10% to 30% of a fastening rotation angle, the electric property of the electric conductor changes.

11. The fastening member loosening detection tag according to claim 1, wherein when the fastened part is displaced in a direction perpendicular to an axis of the fastening member by more than a predetermined deviation amount, the electric property of the electric conductor changes.

12. The fastening member loosening detection tag according to claim 1, wherein:
the base sheet includes
a back surface facing the fastening member and
a front surface exposed to an outside and opposite to the back surface; and
the front surface has a color that is different from a color of the fastened part to which the fastening member is fastened.

13. The fastening member loosening detection tag according to claim 1, wherein the base sheet is made of a soft material.

14. The fastening member loosening detection tag according to claim 1, wherein the base sheet is made of a hard material.

* * * * *